United States Patent
Minner (10) Patent No.: US 11,343,071 B2
(45) Date of Patent: May 24, 2022

(54) EXTENDED CIPHERTEXTS

(71) Applicant: ENTIT SOFTWARE LLC, Sanford, NC (US)

(72) Inventor: Richard Minner, Cupertino, CA (US)

(73) Assignee: Micro Focus LLC, Santa Clara, CA (US)

( * ) Notice: Subject to any disclaimer, the term of this patent is extended or adjusted under 35 U.S.C. 154(b) by 556 days.

(21) Appl. No.: 16/074,890

(22) PCT Filed: Feb. 5, 2016

(86) PCT No.: PCT/US2016/016867
§ 371 (c)(1),
(2) Date: Aug. 2, 2018

(87) PCT Pub. No.: WO2017/135970
PCT Pub. Date: Aug. 10, 2017

(65) Prior Publication Data
US 2019/0044698 A1    Feb. 7, 2019

(51) Int. Cl.
| | |
|---|---|
| *H04L 29/06* | (2006.01) |
| *H04L 9/06* | (2006.01) |
| *H04L 9/08* | (2006.01) |
| *H04L 9/14* | (2006.01) |

(52) U.S. Cl.
CPC .......... *H04L 9/0618* (2013.01); *H04L 9/0894* (2013.01); *H04L 9/14* (2013.01)

(58) Field of Classification Search
CPC ........ H04L 9/0618; H04L 9/0894; H04L 9/14
See application file for complete search history.

(56) References Cited

U.S. PATENT DOCUMENTS

| | | | |
|---|---|---|---|
| 8,208,627 B2 | 6/2012 | Pauker et al. | |
| 8,938,067 B2 | 1/2015 | Martin | |
| 8,949,625 B2 | 2/2015 | Spies et al. | |
| 2002/0071563 A1 | 6/2002 | Kurn et al. | |
| 2002/0159588 A1* | 10/2002 | Kauffman | H04L 9/0662 380/28 |
| 2005/0014503 A1* | 1/2005 | Nakakita | H04W 12/069 455/435.1 |
| 2005/0147241 A1* | 7/2005 | Okeya | G06F 7/723 380/28 |

(Continued)

OTHER PUBLICATIONS

Bellare M. et al., "The FFX Mode of Operation for Format-Preserving Encryption," (Research Paper), NIST Submission 20, Feb. 20, 2010, 18 pages, available at https://csrc.nist.gov/csrc/media/projects/block-cipher-techniques/documents/bcm/proposed-modes/ffx/ffx-spec.pdf.

(Continued)

*Primary Examiner* — Kendall Dolly (57) ABSTRACT

Examples discussed herein disclose, among other things, an encrypting device. The encrypting device may include a format preserving encryptor to obtain a plaintext, obtain a key from a plurality of keys stored in a key database, and encrypt the plaintext using the key to produce a ciphertext having a length of the plaintext. The encrypting device may also include a key reference embedder to obtain a key reference associated with the key, and generate an extended ciphertext by adding to the ciphertext a set of characters associated with the key reference, such that the key reference can be determined based on the extended ciphertext.

20 Claims, 7 Drawing Sheets

(56) References Cited

U.S. PATENT DOCUMENTS

| | | | |
|---|---|---|---|
| 2006/0034456 A1* | 2/2006 | McGough | H04L 9/0844 380/30 |
| 2007/0262138 A1* | 11/2007 | Somers | G06Q 20/40975 235/380 |
| 2009/0316885 A1* | 12/2009 | Mahmud | H04L 9/065 380/28 |
| 2012/0250863 A1* | 10/2012 | Bukshpun | H04L 9/14 380/278 |
| 2012/0296830 A1* | 11/2012 | Deng | G06Q 20/322 705/71 |
| 2014/0198912 A1* | 7/2014 | Mantin | H04L 9/0618 380/28 |
| 2014/0208101 A1* | 7/2014 | Naganuma | H04L 9/008 713/164 |
| 2014/0258725 A1* | 9/2014 | Shea | H04L 63/061 713/171 |
| 2014/0294176 A1* | 10/2014 | Endo | H04L 9/0838 380/46 |
| 2014/0344164 A1* | 11/2014 | Pauker | G06Q 20/3829 705/71 |
| 2014/0369496 A1 | 12/2014 | Yokota et al. | |
| 2015/0006910 A1 | 1/2015 | Shapiro | |
| 2017/0171174 A1* | 6/2017 | Campagna | H04L 63/0876 |
| 2019/0207758 A1* | 7/2019 | Cambou | H04L 9/30 |
| 2020/0235922 A1* | 7/2020 | Minner | H04L 9/0861 |

OTHER PUBLICATIONS

International Searching Authority., International Search Report and Written Opinion dated Dec. 7, 2016 for PCT Application No. PCT/US2016/016867 Filed Feb. 5, 2016, 15 pages.

\* cited by examiner

EXTENDED CIPHERTEXTS

BACKGROUND

Some cryptographic systems today support a mechanism called "key rollover," where a given encryption key being used to encrypt plaintext can at some point be retired and replaced by another encryption key. In these systems, in order to decrypt a ciphertext (i.e., an encrypted plaintext), the decrypting device needs to first determine which key was used to generate the ciphertext. For example, in a system that supports up to 64 different keys, the decrypting device needs to determine which of the 64 possible keys was used to perform the encryption.

BRIEF DESCRIPTION OF THE DRAWINGS

The following detailed description references the drawings, wherein.

DETAILED DESCRIPTION

One approach to determining the key that was used to generate a particular ciphertext is to use external data, such as timestamps or related database columns. This approach is often unreliable, technologically challenging, or both. Another approach is to embed into the ciphertext a key reference which can be used by the decrypting device to determine the key. This can be achieved, for example, by expanding the character domain of the ciphertext relative to the character domain of the plaintext and use the additional character space to embed the key reference. As used herein, a "character domain" may correspond to any finite set of characters. To illustrate how domain expansion can be used to support key rollover, a system can be considered in which numerical plaintexts are be mapped to alphanumerical ciphertexts, thereby expanding the character domain from ten to 36 characters, where 36 corresponds to ten digits plus 26 letters of the English alphabet (assuming, e.g., that the system is not case sensitive). In such a system, a six-character-long numerical plaintext, for example, can be mapped into $36^6/10^6=2176$ different six-character-long alphanumeric ciphertexts, which means that the system can support up to 2176 different encryption keys for plaintexts up to six characters long.

This approach may not be available, however, in systems in which the character domain of the plaintext cannot be expanded. For example, some systems may be unable to store, display, transfer, or otherwise process characters outside of a certain character domain. For example, a particular system may be able to process (e.g., display, store, etc.) strings containing printable American Standard Code for Information Interchange (ASCII) characters (ASCII codes 32-126), but may not be able to process strings containing other characters (e.g., ASCII codes 0-31 and 127-255). If such a system supports encryption of plaintexts containing any printable ASCII characters, the system would not be able to display or otherwise process ciphertexts having characters other than the printable ASCII characters. In addition, some systems may be able to expand the character domain to a certain degree, but may not be able to expand it to a degree that would allow for a sufficient number of encryption keys.

Accordingly, examples discussed below include, among other things, devices, systems and methods for adding a set of characters representing a key reference into a ciphertext, where the character domain of the ciphertext is the same (or at least not larger) than the character domain of the plaintext. Specifically, some examples discussed herein include an encrypting device. The encrypting device may include a format preserving encryptor to obtain a plaintext, obtain a key from a plurality of keys stored in a key database, and encrypt the plaintext using the key to produce a ciphertext having a length of the plaintext. The encrypting device may also include a key reference embedder to obtain a key reference associated with the key, and generate an extended ciphertext by adding to the ciphertext a set of characters associated with the key reference, such that the key reference can be determined based on the extended ciphertext.

Figure 1:
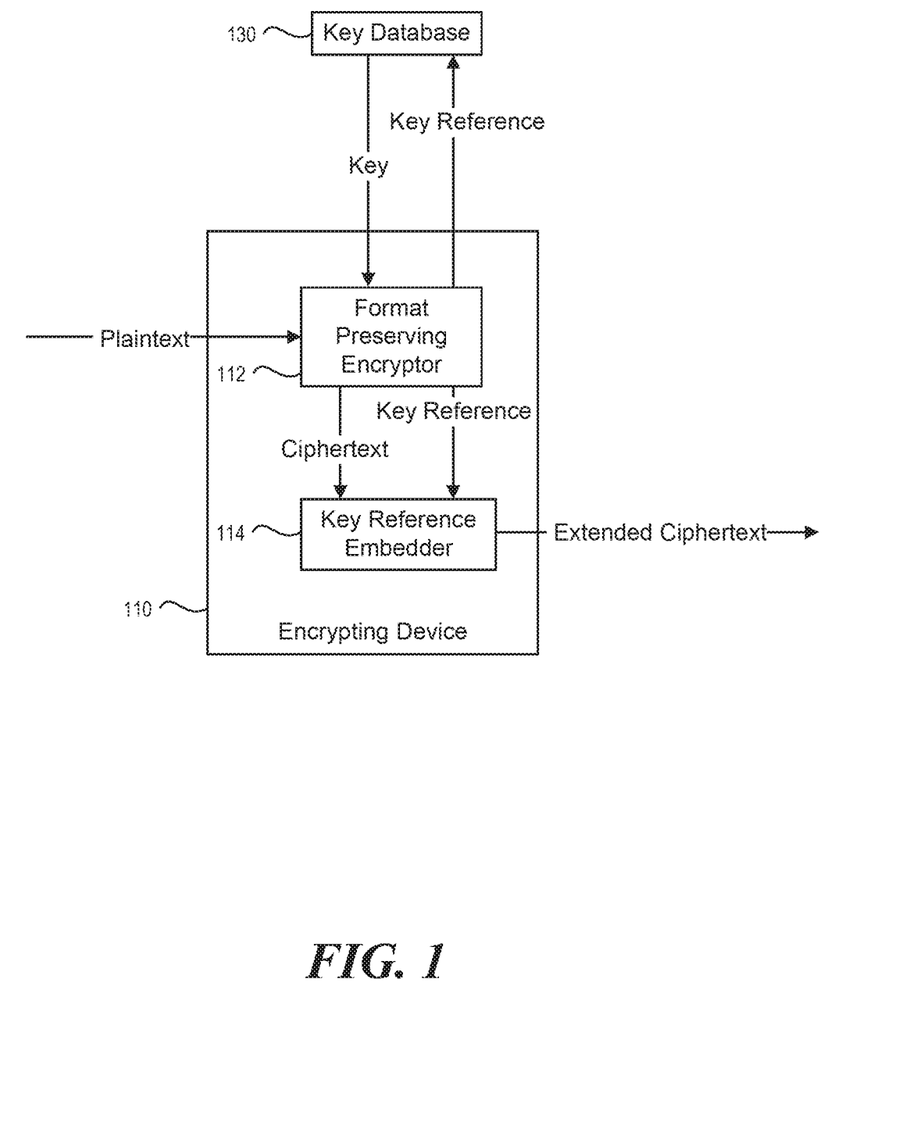
FIG. 1 is a block diagram of an example encrypting device.

FIG. 1 shows an example encrypting device 110. Encrypting device 110 may include any type of electronic device suitable for performing the functionality discussed herein. For example, encrypting device 110 be a smartphone, a computer of any kind (e.g., a laptop, a desktop computer, a server, and so forth), a network device, a gaming device, a home appliance, or any other type of electronic device or equipment. In some examples, encrypting device 110 may include a combination of any number of electronic devices or engines that together may implement the functionality of encrypting device 110 described herein.

As illustrated in FIG. 1, encrypting device 110 may include, among other things, a format preserving encryptor 112 and a key reference embedder 114, each of which may generally represent any combination of hardware and programming that may be embedded in encrypting device 110 or communicatively coupled thereto. For the purpose of illustration, format preserving encryptor 112 and key reference embedder 114 are described herein as separate engines communicatively coupled to each other. However, it is appreciated that the functionality of format preserving encryptor 112 and key reference embedder 114 may also be implemented in a single engine, or distributed over any number of communicatively coupled engines.

Encrypting device 110 may also include or be communicatively coupled to a key database 130 in a wired fashion, wirelessly, through a network, or in any other fashion. Key database 130 may be implemented as any combination of any number of storage or memory devices, such as Random Access Memories (RAMs), Electrically-Erasable Programmable Read-Only Memories (EEPROMs), storage drives, optical discs, memristor-based memories, or any other types of storage or memory devices. In some examples, some or all communications between encrypting device 110 (e.g., format preserving encryptor 112) and key database 130 may be encrypted.

As illustrated in FIG. 1, format preserving encryptor 112 may obtain a plaintext to be encrypted. The plaintext may be obtained, for example, from a memory, from a user input device (e.g., a physical or virtual keyboard), or from any other type of engine or device, which may be either included in encrypting device 110 or communicatively coupled thereto. The obtained plaintext may include any number of characters, where the characters may be any characters from a certain character domain. In some examples, all plaintexts obtained and encrypted by format preserving encryptor 112 may contain characters from the same character domain.

After obtaining the plaintext, format preserving encryptor 112 may encrypt the plaintext to produce a ciphertext. In some examples, format preserving encryptor 112 may encrypt the plaintext in a format-preserving fashion, such that the length and the character domain of the resulting ciphertext are the same as those of the plaintext. In order to encrypt the plaintext, format preserving encryptor 112 may first obtain an encryption key from key database 130.

Key database may store a predefined number of predefined or dynamically generated encryption keys, for brevity referred to hereinafter as "keys." In some examples, each key may be associated with a key reference uniquely identifying the key among all the keys available for encryption. Key reference may be the key's number (e.g., 1, 2, 3, etc.), a string representing the key's serial number (e.g., "01," "02," "03," etc.), a string representing the key's unique name (e.g., "KEY_A," "KEY_B," "KEY_C," etc.), a string representing a timestamp associated with the key (e.g., "2016/01/01," "2016/02/01," etc.), or any other type of reference uniquely identifying the key.

In some examples, format preserving encryptor 112 may obtain a particular key from key database 130 by providing to key database 130 the key reference of the desired key. In other examples (not shown in FIG. 1 for brevity) format preserving encryptor 112 may not provide key database 130 with a particular key reference. Instead, it may request key database 130 to provide any key from the available keys, or any key that is different from the key that was used by format preserving encryptor 112 most recently. In response, key database 130 may provide to format preserving encryptor 112 one of the keys, along with its key reference.

After obtaining the key, format preserving encryptor 112 may use the key to encrypt the plaintext using format-preserving encryption. The result of such encryption is a ciphertext containing the same number of characters of the same domain as the plaintext. For example, format preserving encryptor 112 may use the key to pseudo-randomly map a plaintext containing N characters into one of $D^N$ possible ciphertext containing N characters, where D is the size of the character domain of both the plaintext and the ciphertext.

After encrypting the plaintext, format preserving encryptor 112 may pass the resulting ciphertext to key reference embedder 114. As illustrated in FIG. 1, in addition to the ciphertext, format preserving encryptor 112 may pass to key reference embedder 114 the key reference identifying the key with which the plaintext was encrypted to produce the ciphertext. Having obtained the ciphertext and the key reference, key reference embedder 114 may produce an extended ciphertext by embedding the key reference into the ciphertext. In some examples, key reference embedder 114 may embed the key reference by adding to the ciphertext a set of characters representing the key reference, i.e., a set of characters based on which the key reference may be determined. The set of characters may include any number of characters, where the number of characters can be predefined, and where the same predefined number of characters may be added to all ciphertexts processed by key reference embedder 114, irrespective of the length of the ciphertexts. The set of characters may include, for example, one character (e.g., "0" "1," . . . "9," "A," "B," etc.); two characters (e.g., "01," "02," etc.); five characters (e.g., "KEY_B," "KEY_C," etc.); or any other predefined number of characters. In some examples, the set of characters representing the key reference can be from the same character domain as the plaintext and as the ciphertext, and cannot include any characters outside of that character domain.

In some examples, the set of characters representing the key reference may be added at a set of predefined positions within the ciphertext. The set of predefined positions may include one position or a plurality of positions. The positions at which the characters can be added may be inside the ciphertext (i.e., inserted between characters of the ciphertext), or adjacent to the ciphertext (e.g., prepended or appended to the ciphertext). If the set of characters to be added contains two or more characters, the characters may or may not be added together as one block. In other words, in some examples, any character of the set of characters may be added at any position of the ciphertext. In some examples, a position may be predefined relative to the first or the last character of the ciphertext.

In some examples, key reference embedder 114 may also obfuscate the set of characters such that the set of characters cannot be readily apparent to an observer unfamiliar with the obfuscation method that was used. For example, key reference embedder 114 may modify the set of characters based on the ciphertext, e.g., based on the length of the ciphertext, and/or based on any number of characters of the ciphertext. Thus, in some examples, the added set of characters may depend on the value of the ciphertext, meaning that the same key reference may be represented by different sets of character in different ciphertexts. For example, key reference embedder 114 may obfuscate the set of characters by adding, to each of the characters, the value of the last character of the ciphertext, and modulating the resulting character such that it stays within the character domain.

After producing the extended ciphertext, key reference embedder 114 may send the extended ciphertext, for example, to another device via one or more local-area and/or wide-area networks, such as the Internet. While the above examples describe producing the extended ciphertext by first producing a ciphertext by format preserving encryptor 112 and then adding the set of characters representing the key reference by key reference embedder 114, it is appreciated that in other examples the extended ciphertext may be produced by fewer steps or more steps, that the steps may be performed in a different order, and that the steps may be performed by a different number of engines (e.g., by a single engine or by two or more engines).

Figure 2:
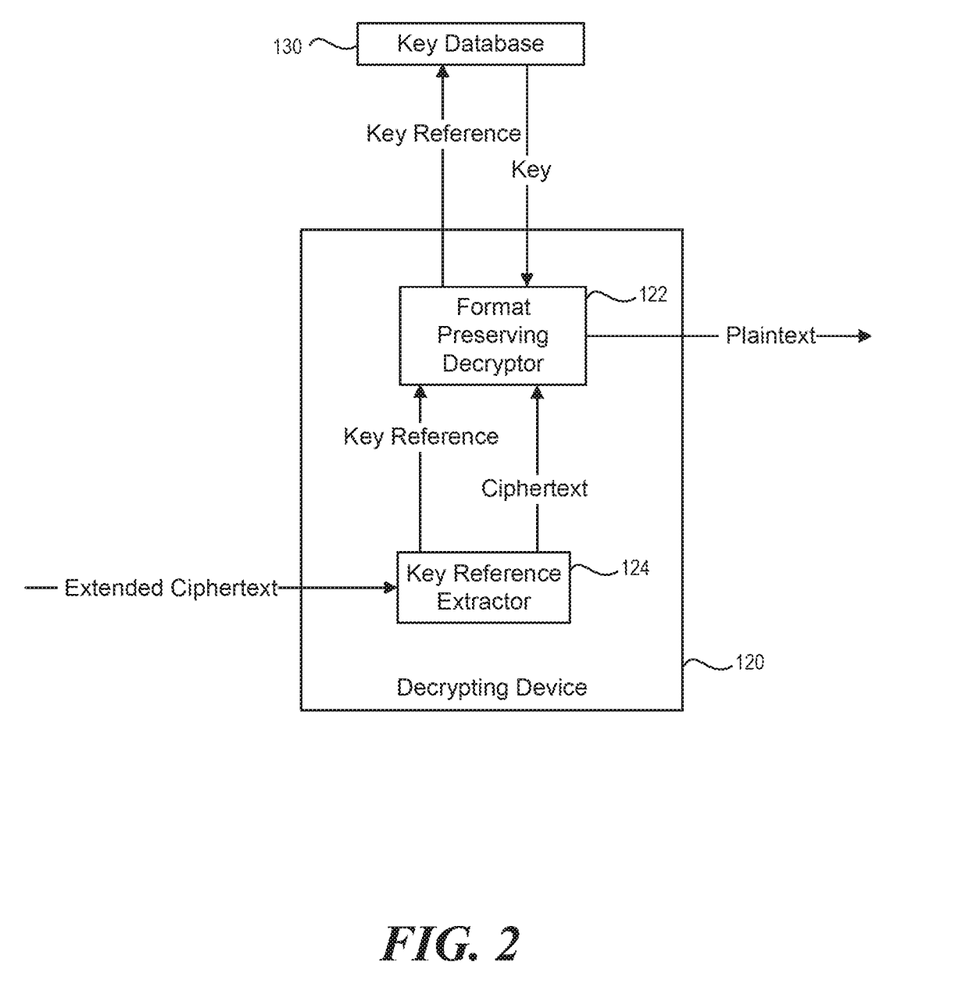
FIG. 2 shows an example decrypting device.

FIG. 2 illustrates an example decrypting device 120 that may receive an extended ciphertext generated by encrypting device 110. Decrypting device 120 may be any type of electronic device suitable for performing the functionality discussed herein. For example, decrypting device 120 be a smartphone, a computer of any kind (e.g., a laptop, a desktop computer, a server, and so forth), a network device, a gaming device, a home appliance, or any other type of electronic device or equipment. In some examples, decrypting device 120 may include a combination of any number of electronic devices or engines which together may implement the functionality of decrypting device 120 described herein.

As illustrated in FIG. 2, decrypting device 120 may include, among other things, a format preserving decryptor 122 and a key reference extractor 124, each of which may generally represent any combination of hardware and programming that may be embedded in decrypting device 120 or communicatively coupled thereto. For the purpose of illustration, format preserving decryptor 122 and key reference extractor 124 are described herein as separate engines communicatively coupled to each other. However, it is appreciated that the functionality of format preserving decryptor 122 and key reference extractor 124 may also be implemented in a single engine, or distributed over any number of communicatively coupled engines.

Decrypting device 120 may also include or be communicatively coupled to key database 130 or to another key database that stores the same keys and in association with the same key references as key database 130. As illustrated in FIG. 2, decrypting device 120 may obtain an extended ciphertext, such as an extended ciphertext generated by encrypting device 110, as discussed above. The extended ciphertext may be obtained by decrypting device 120 through one or more local-area or wide-area networks, from a memory or a storage device, or from any other source.

After obtaining the extended ciphertext, decrypting device 120 may pass the extended ciphertext to key reference extractor 124. Key reference extractor 124 may obtain, based on the extended ciphertext, the key reference that was embedded into the extended ciphertext (e.g., by key reference embedder 114 of encrypting device 110), and pass the key reference to format preserving decryptor 122. Key reference extractor 124 may obtain the key reference by obtaining from the extended ciphertext the set of characters that are positioned at the set of predefined positions, i.e., the same positions that were used by key reference embedder 114 discussed above. In some examples, the key reference may be determined directly based on the set of characters. In other examples, the set of characters may have been obfuscated based on the length or the contents of the ciphertext, as discussed above. In those examples, key reference extractor 124 may, after obtaining the set of characters, de-obfuscate the set of characters based on the ciphertext, e.g., by using a reverse function to the function that was used to obfuscate the set of characters.

After obtain the key reference, key reference extractor 124 may remove the key reference from the extended ciphertext, thereby producing the original ciphertext, and provide the original ciphertext to format preserving decryptor 122. Format preserving decryptor 122 may then use the key reference to obtain the key with which the ciphertext was encrypted. For example, format preserving decryptor 122 may provide the key reference to key database 130, and in response receive from key database 130 the key corresponding to the key reference. Having obtained the key, format preserving decryptor 122 may decrypt the ciphertext using the obtained key, and thus obtain the plaintext. Format preserving decryptor 122 may then send the plaintext to another device, store it in a memory, display it on a display, and so forth.

While the above examples describe decrypting the extended ciphertext by first extracting the key reference by key reference extractor 124 and then decrypting the original ciphertext by format preserving decryptor 114, it is appreciated that in other examples the extended ciphertext may be produced by fewer steps or more steps, that the steps may be performed in a different order, and that the steps may be performed by a different number of engines (e.g., by a single engine or by two or more engines).

Figure 3A:
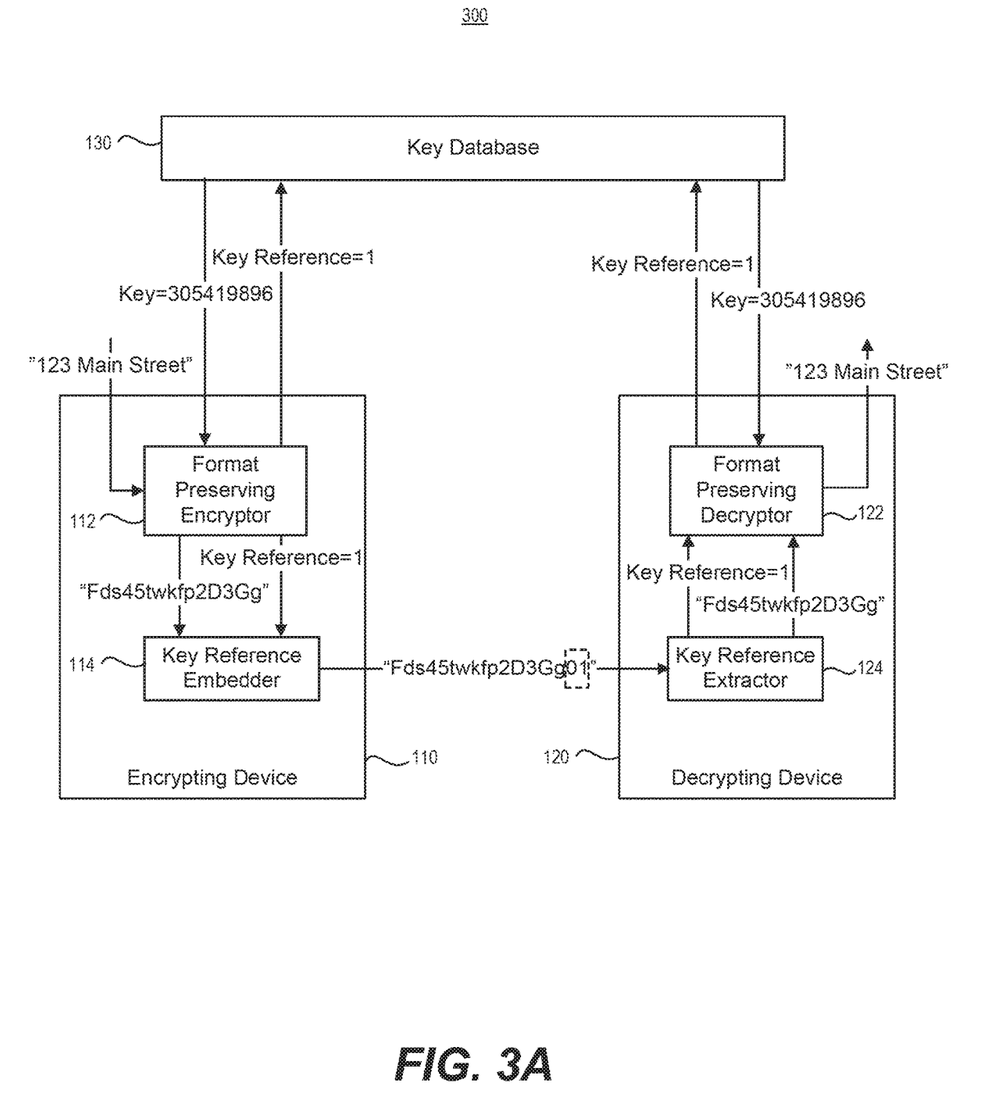
FIG. 3A shows an example system that includes an example encrypting device and an example decrypting device.

Some of the examples described above are further illustrated in FIGS. 3A-3C. FIG. 3A illustrates an example system 300 that includes an example encrypting device 110 and an example decrypting device 120, each coupled to key database 130. As discussed above, in other examples, devices 110 and 120 may be coupled to different key databases, as long as the key databases store the same key in association with the same key references. In the example of FIG. 3A, encrypting device 110 obtains a plaintext "123 Main Street" containing fifteen characters. In this examples, it can be assumed that encrypting device 110 is configured to process plaintexts containing any characters from the printable ASCII domain, i.e., any characters having ASCII codes 32-126. After obtaining the plaintext, format preserving encryptor 112 decides to encrypt the plaintext using a first key, i.e., a key associated with a key reference of 1. Accordingly, encryptor 112 obtains from key database 130 the key (305419896) that corresponds to key reference number 1. Encryptor 112 then encrypts the plaintext with that key to produce a ciphertext "Fds45twkfp2D3Gg" having the same number of characters as the plaintext, where the characters belong to the same character domain as the plaintext. Key reference embedder 114 then embeds into the ciphertext a set of two characters "01" representing the key reference. In this example, embedder 114 does not obfuscate the set of characters. As discussed above, the set of characters may be embedded at predefined positions in the ciphertext. In this example, the predefined positions are the first and second position after the last character of the ciphertext. Thus, the resulting extended ciphertext is "Fds45twkfp2D3Gg01." The extended ciphertext is then provided to decrypting device 120, which uses key reference extractor 124 to extract from the extended ciphertext the set of characters "01" representing the key reference. Based on the set of characters, key reference extractor 124 determines that the key reference is 1, removes the set of characters from the extended ciphertext to obtain the original ciphertext, and provides the key reference and the ciphertext to format preserving decryptor 122. Decryptor 122 then uses the key reference to obtain from key database 130 the key that was used to encrypt the ciphertext, and uses the key to decrypt the ciphertext and obtain and output the original plaintext "123 Main Street."

Figure 3B:
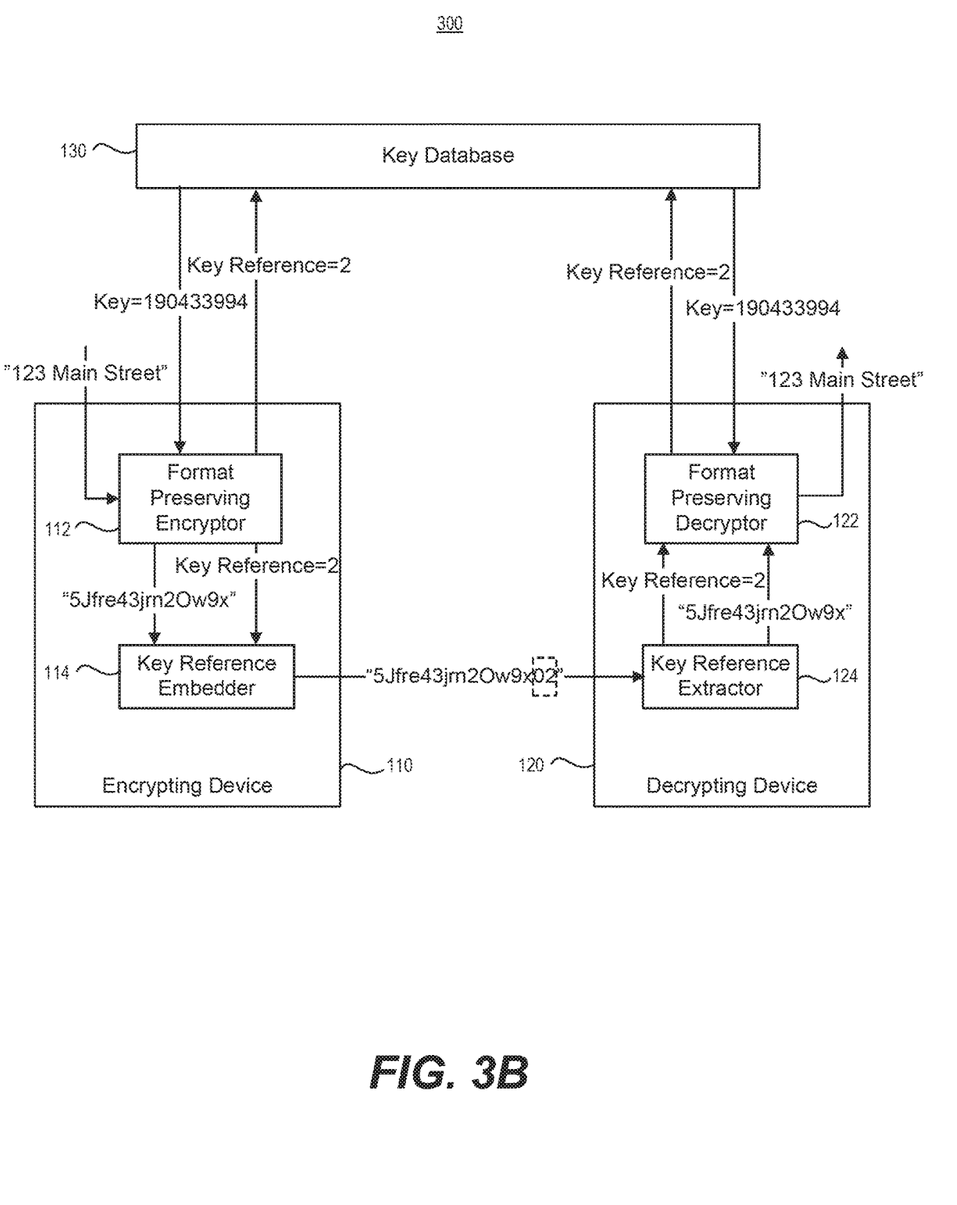
FIG. 3B also shows an example system that includes an example encrypting device and an example decrypting device.

In the example of FIG. 3B, encrypting device 110 obtains the same plaintext "123 Main Street," but in this example, format preserving encryptor 112 decides to perform key rollover, and to encrypt the plaintext with a second key, different than the first key. Accordingly, encryptor 112 obtains from key database 130 a new key (190433994) corresponding to key reference 2, and encrypt the plaintext with that key to produce a different ciphertext "5Jfre43jrn2Ow9x," also having the same number of characters from the same character domain as the plaintext. Key reference embedder 114 then embeds into the ciphertext a set of two characters "02" at the predefined positions (i.e., immediately at the end of the ciphertext). In this example, embedder 114 does not obfuscate the set of characters. Thus, the resulting extended ciphertext is "5Jfre43jrn2Ow9x02." The extended ciphertext is then provided to decrypting device 120, which decrypts it in a similar fashion to that discussed above.

Figure 3C:
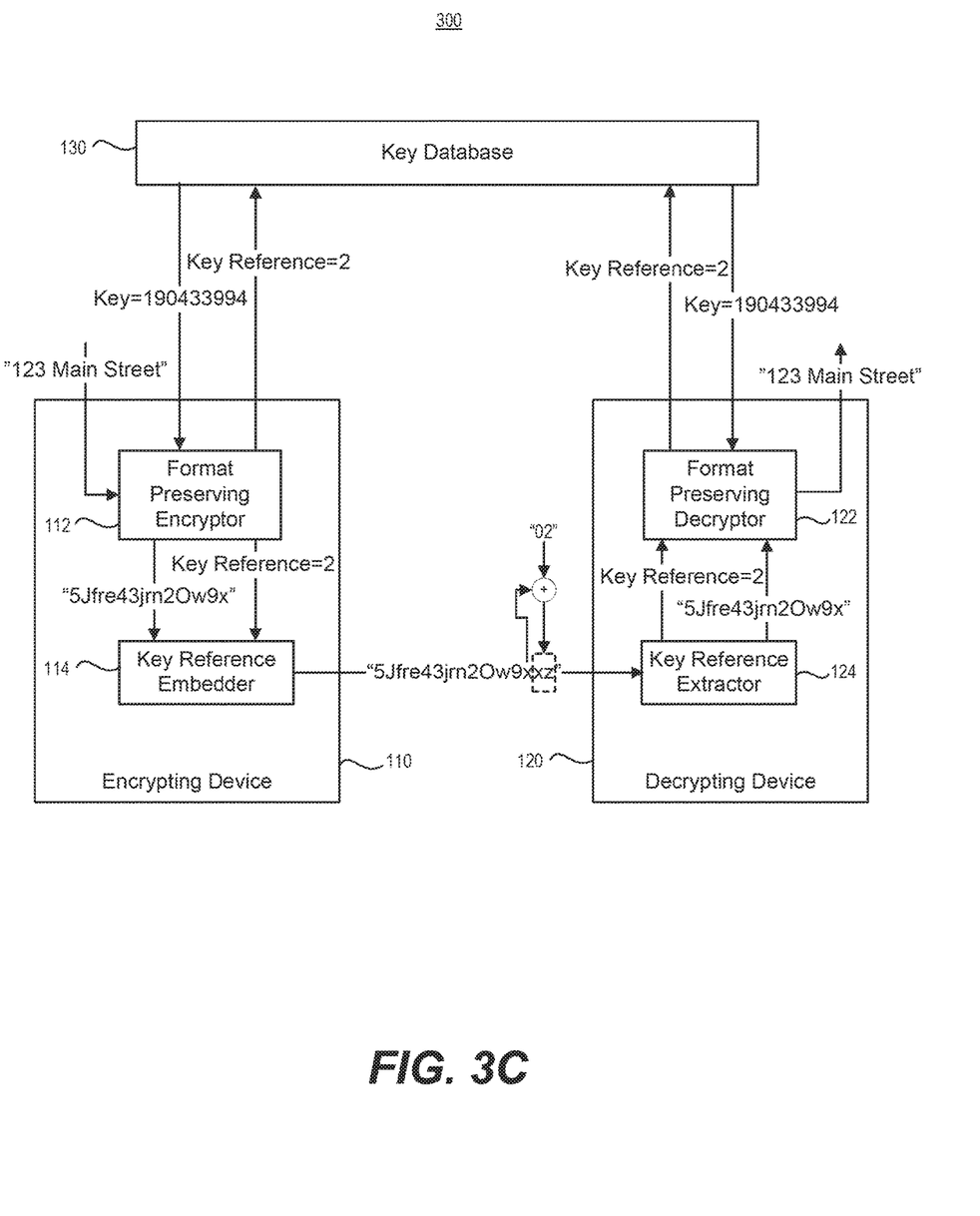
FIG. 3C also shows an example system that includes an example encrypting device and an example decrypting device.

In the example of FIG. 3C, encrypting device encodes the same plaintext using the same key (associated with key reference number 2). However, in this example, key reference embedder 114 obfuscates the two characters representing the key reference ("02") by adding to each of the characters the ASCII value of the last character of the ciphertext ("x"). The resulting obfuscated set of characters ("xz") is then embedded at the same predefined positions— i.e., at the end of the ciphertext. In this example, when key reference extractor obtains the extended ciphertext and extracts the set of characters ("xz"), it de-obfuscates the set of characters by subtracting from each character the value of the last character of the ciphertext ("x") and obtaining the original set of characters ("02").

In the foregoing discussion, various engines, such as format preserving encryptor 112, key reference embedder 114, format preserving decryptor 122, and key reference extractor 124 were described as any combinations of hardware and programming. Such components may be implemented in a number of fashions. The programming may be processor executable instructions stored on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like.

Figure 4:
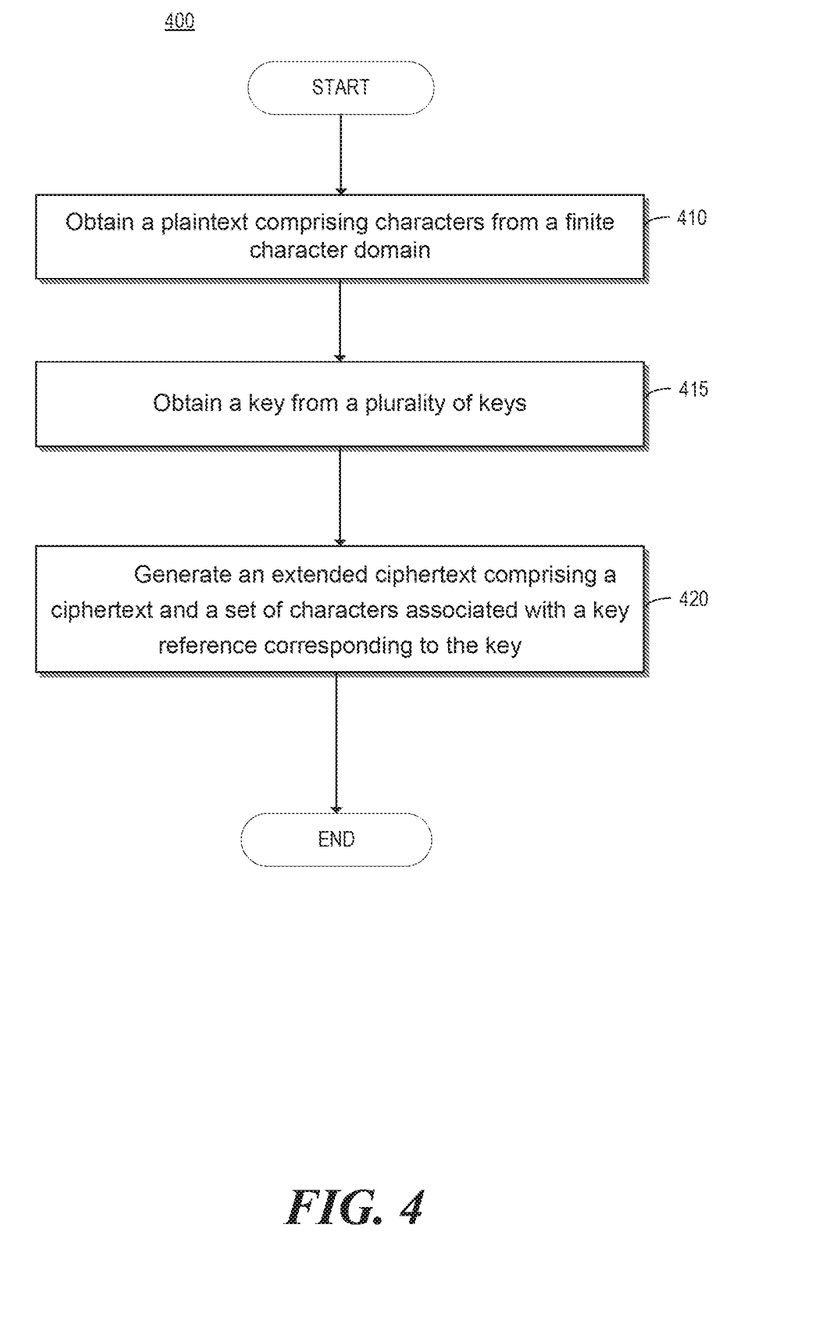
FIG. 4 shows an example method.

FIG. 4 is a flowchart of an example method 400. Method 400 may be described below as being executed or performed by a system or by an encrypting device such as encrypting device 110 of FIG. 1. Other suitable systems and/or encrypting devices may be used as well. Method 400 may be implemented in the form of executable instructions stored on at least one non-transitory machine-readable storage medium of the system and executed by at least one processor of the system. Method 400 may also be implemented in the form of electronic circuitry (e.g., hardware). In other examples of the present disclosure, any number of blocks of method 400 may be executed substantially concurrently or in a different order than shown in FIG. 4. In other examples of the present disclosure, method 400 may include more or less blocks than are shown in FIG. 4. In some examples, any blocks of method 400 may, at certain times, be ongoing and/or may repeat.

At block 410, method 400 may obtain a plaintext comprising characters from a finite character domain. At block 415, the method may obtain a key from a plurality of keys. At block 420, the method may generate an extended ciphertext that may include a ciphertext produced by encrypting the plaintext with the key, and a set of characters associated with a key reference corresponding to the key. As discussed above, in some examples, the ciphertext may not include characters outside of the finite character domain.

Figure 5:
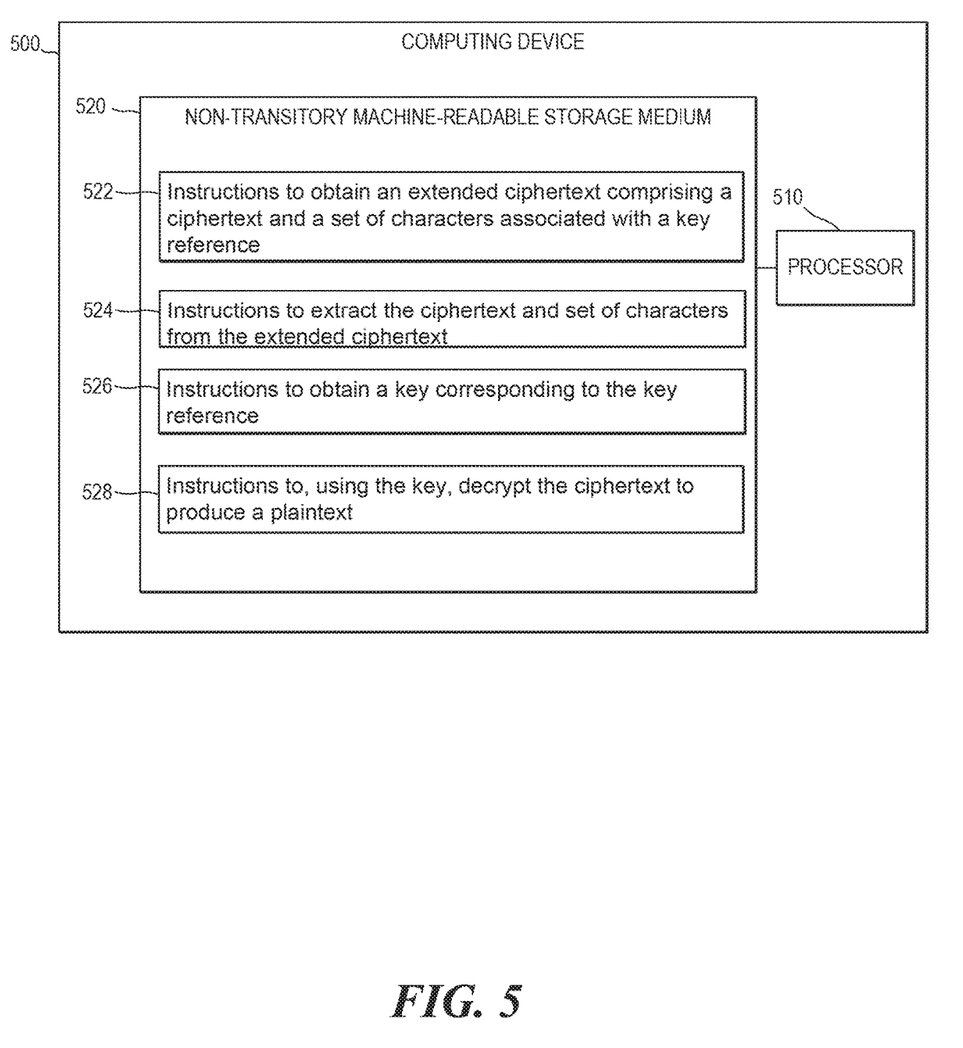
FIG. 5 is another block diagram of an example computing device.

FIG. 5 is a block diagram of an example computing device 500. Computing device 500 may be similar to or different from decrypting device 120 of FIG. 2. In the example of FIG. 5, computing device 500 includes a processor 510 and a non-transitory machine-readable storage medium 520. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 510 include any number of central processing units (CPUs), microprocessors, and/or other hardware devices suitable for retrieval and execution of instructions stored in non-transitory machine-readable storage medium 520. In the particular example shown in FIG. 5, processor 510 may fetch, decode, and execute instructions 522, 524, 526, and 528, and any other instructions (not shown for brevity). Instead of or in addition to retrieving and executing instructions, processor 510 may include any number of electronic circuits comprising a number of electronic components for performing the functionality of any number of instructions in machine-readable storage medium 520. With respect to the executable instruction representations (e.g., boxes) described and shown herein, it should be understood that part or all of the executable instructions and/or electronic circuits included within one box may, in other examples, be included in a different box shown in the figures or in a different box not shown.

Non-transitory machine-readable storage medium 520 may be any electronic, magnetic, optical, or other physical storage device that stores executable instructions. Thus, medium 520 may be, for example, Random Access Memory (RAM), an Electrically-Erasable Programmable Read-Only Memory (EEPROM), a storage drive, an optical disc, and the like. Medium 520 may be disposed within encrypting device 500, as shown in FIG. 5. In this situation, the executable instructions may be "installed" on computing device 500. Medium 520 may be a portable, external or remote storage medium, for example, that allows computing device 500 to download the instructions from the portable/external/remote storage medium. In this situation, the executable instructions may be part of an "installation package". As described herein, medium 520 may be encoded with executable instructions.

Referring to FIG. 5, instructions 522, when executed by a processor (e.g., 510), may cause a computing device (e.g., 500) to obtain an extended ciphertext comprising a ciphertext and a set of characters associated with a key reference. Instructions 524, when executed by the processor, may cause the computing device to extract the ciphertext and set of characters from the extended ciphertext. Instructions 526, when executed by the processor, may cause the computing device to obtain a key corresponding to the key reference. Instructions 528, when executed by the processor, may cause the computing device to, using the key, decrypt the ciphertext to produce a plaintext.

The invention claimed is:

1. An encrypting device comprising:
 a format preserving encryptor that:
  obtains a plaintext,
  obtains a key from a plurality of keys stored in a key database, and
  encrypts the plaintext using the key to produce a ciphertext having a length of the plaintext; and
 a key reference embedder that:
  obtains a key reference associated with the key, and
  generates an extended ciphertext by adding to the ciphertext a set of characters representing the key reference, such that the key reference is determined based on the extended ciphertext, wherein the key reference embedder obfuscates the set of characters based on the ciphertext.

2. The encrypting device of claim 1, wherein the ciphertext and the extended ciphertext do not comprise characters outside of a character domain associated with the plaintext.

3. The encrypting device of claim 1, wherein the set of characters comprises a predefined number of characters, and wherein the key reference embedder generates the extended ciphertext by adding the set of characters at a set of predefined positions in the ciphertext.

4. The encrypting device of claim 1, wherein the key reference is determined based on the set of characters independently from the ciphertext.

5. The encrypting device of claim 1, wherein the set of characters is a predefined number of characters.

6. The encrypting device of claim 5, wherein the predefined number of characters is added to all ciphertexts processed by the key reference embedder, and wherein the ciphertexts comprise the ciphertext.

7. The encrypting device of claim 6, wherein ciphertexts comprise a first ciphertext and a second ciphertext, and wherein at least the first ciphertext and the second ciphertext are different lengths.

8. The encrypting device of claim 1, wherein the key reference embedder obfuscates the set of characters based on the length of the ciphertext.

9. The encrypting device of claim 1, wherein the key reference embedder obfuscates the set of characters based on at least one character of the ciphertext.

10. A method comprising:
obtaining a plaintext comprising characters from a finite character domain;
obtaining a key from a plurality of keys; and
generating an extended ciphertext comprising:
a ciphertext produced by encrypting the plaintext with the key, wherein the ciphertext does not comprise characters outside of the finite character domain, and
a set of characters representing a key reference corresponding to the key, wherein the set of characters is obfuscated based on the ciphertext.

11. The method of claim 10, wherein the set of characters does not comprise characters outside of the finite character domain.

12. The method of claim 10, wherein the ciphertext has a same length as the plaintext.

13. The method of claim 10, wherein the set of characters comprises a predefined number of characters, and wherein the set of characters are positioned at a set of predefined positions within the extended ciphertext.

14. The method of claim 10, wherein the set of characters are positioned adjacent to the ciphertext.

15. The method of claim 10, further comprising obfuscating the set of characters based on at least one of: a length of the ciphertext, and at least one character of the ciphertext.

16. A non-transitory machine-readable storage medium encoded with instructions that, when executed by a processor of a computing device, cause the computing device to:
obtain an extended ciphertext comprising a ciphertext and a set of characters representing a key reference, wherein the set of characters is obfuscated based on the ciphertext;
extract the ciphertext and set of characters from the extended ciphertext;
obtain a key corresponding to the key reference; and
using the key, decrypt the ciphertext to produce a plaintext.

17. The non-transitory machine-readable storage medium of claim 16, wherein the plaintext is a same length as the ciphertext and is associated with a same character domain as the ciphertext.

18. The non-transitory machine-readable storage medium of claim 16, wherein the set of characters are positioned within the extended ciphertext immediately adjacent to the ciphertext.

19. The non-transitory machine-readable storage medium of claim 16, wherein the set of characters comprises a predefined number of characters.

20. The non-transitory machine-readable storage medium of claim 16, wherein obtaining the key comprises receiving the key from a key database in response to a query comprising the key reference.

* * * * *